(12) United States Patent
Chai et al.

(10) Patent No.: US 7,404,103 B2
(45) Date of Patent: *Jul. 22, 2008

(54) SYSTEMS AND METHODS FOR RESTORING DATA

(75) Inventors: Mu Chai, Bellevue, WA (US); Craig Duncan, Issaquah, WA (US); Aditya Kapoor, Bellevue, WA (US); Wenlu Ma, Sammamish, WA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/651,971

(22) Filed: Jan. 9, 2007

(65) Prior Publication Data
US 2007/0180289 A1 Aug. 2, 2007

Related U.S. Application Data

(63) Continuation of application No. 11/080,047, filed on Mar. 15, 2005, now Pat. No. 7,210,060.

(60) Provisional application No. 60/640,800, filed on Dec. 30, 2004.

(51) Int. Cl.
*G06F 11/00* (2006.01)

(52) U.S. Cl. .................. 714/6; 714/4; 714/11; 714/12; 714/15

(58) Field of Classification Search .................... 714/4, 714/6, 11, 12, 15
See application file for complete search history.

(56) References Cited

U.S. PATENT DOCUMENTS

| 5,852,715 | A | 12/1998 | Raz et al. |
| 6,035,412 | A | 3/2000 | Tamer et al. |
| 2003/0005120 | A1 | 1/2003 | Mutalik et al. |
| 2004/0236984 | A1 | 11/2004 | Yamasaki |

*Primary Examiner*—Robert W Beausoliel, Jr.
*Assistant Examiner*—Charles Ehne
(74) *Attorney, Agent, or Firm*—Workman Nydegger (57) ABSTRACT

In a network that includes a first database located on a first client and a second database located on a second client, a user or administrator initiates a restore operation. A dynamic mirror relationship existing between the first and second clients is terminated and a backup version of a database which the user or administrator wishes to recreate is identified. One of the first or second clients receives information concerning the location of the backup version of the database, as well as the role designation of the database at the time the backup operation was performed, from a restore server. The backup version of the database is retrieved from the storage location and recreated on each of the first and second clients, and the dynamic mirror relationship is reestablished between the first and second clients.

23 Claims, 5 Drawing Sheets

SYSTEMS AND METHODS FOR RESTORING DATA

CROSS REFERENCE TO RELATED APPLICATIONS

This application is a continuation application of U.S. patent application Ser. No. 11/080,047, filed Mar. 15, 2005, which application claims priority to U.S. Provisional Patent Application Ser. No. 60/640,800 filed Dec. 30, 2004, which applications are hereby incorporated herein by reference in their entireties.

BACKGROUND OF THE INVENTION

1. The Field of the Invention

The present invention relates to systems and methods for restoring data that has been lost. More particularly, embodiments of the invention relate to systems and methods for restoring data in a database mirroring environment.

2. Related Technology

Computer networks are ubiquitous in both residential and commercial environments. In addition to widespread Internet use, local area networks (LANs) allow users to share computer services. Many corporate entities use LANs within their organizations and provide consumers with access to data over the Internet.

Dependence on computers and computer networks has created a need for improved availability and reliability of data. Many commercial entities store nearly all business data on a computer network, and network users expect uninterrupted access to the data at any given time. Software and hardware with enhanced capabilities are needed to support this demand for uninterrupted access to data. As the amount of data stored on a network, and the demand for accessibility to data on the network, grows, it becomes increasingly difficult to protect data from unforeseen events such as system failures, file corruption and viruses.

Protecting data from potentially devastating events is typically accomplished through a combination of software to back up the data, and secure hardware to store the backed-up data. As the amount of data to be preserved increases, the process of backing up the data becomes more complex. For example, gigabytes of data cannot be quickly transferred from a primary location to a backup location. In addition, making the data unavailable while the backup is performed is not a feasible option for environments where continual access to data is imperative.

Although backing up large amounts of data is problematic, it is not the only problem related to typical data backup systems. Network users and administrators may wish to back up various kinds of data. In addition to backing up files, network users may also wish to back up applications and services. Backing up applications and services can be challenging. For example, applications and services often have open files when the backup is initiated but because open files cannot generally be effectively or reliably backed up, such files are often skipped during backup operations. As a result, additional backup applications are often needed to help manage backup operations for applications and services whose files were skipped during the initial file system backup.

Another problem related to backing up data concerns the manner in which the backed-up data will be tracked when the data is moved to a backup location. In particular, when data is backed up, the backup copy is moved to a new location, thus making it necessary to have a record of how the data has been stored in order to facilitate access to the stored data. Typically, backup systems include a database that records the exact location of each file or application that is backed up. When a user wishes to locate or retrieve a file from the backup system, the database locates the file at the stored location of the file in the backup media.

While tracking the location of the backed-up data, typical backup software systems simply place the data in a backup location and track the location in an index. More intelligent database software systems have the ability to sort the data as it is backed up, so that the data is stored intelligently. For example, a more sophisticated database software system can store backups of like files on the same media. Sorting and storing data in this manner allows for more efficient data storage and retrieval.

Another shortcoming of typical backup software systems is their inability to allow for relocation of the data within a network, or to have more than one copy of the data available within the network Although the backup software system collects data from all users on the network, the data itself is viewed as residing at one single location on the network and is not cross referenced to other locations. While the data on the network is backed up, this redundancy and cross referencing are not addressed.

Access to backed-up data is an important consideration in the configuration of database backup systems. A purpose of backing up data is to preserve data in a way so that if files are damaged or lost, the backup copy can be retrieved and the file can be restored. When a file is corrupted or lost, a user requests a backup copy of the file from the backup server. The backup server then locates the file, using the location stored in the file index and media database, retrieves the file, and makes the file available for the user.

BRIEF SUMMARY

In a network that includes a first database residing on a first client, and a second database residing on a second client, the first and second databases being connected together in a dynamic mirror relationship identifying one database as mirror status and the other as live status, a method is disclosed for restoring backed-up data. The method includes initiating a request for a restore operation, terminating the dynamic mirror relationship between the first database and the second database, identifying target data to be restored, generating a request for location information for the target data, receiving location information concerning the location of the target data, transmitting a request to a restore server for the target data, receiving the target data from the restore server, recreating the target data in the first and second databases located on the first and second clients; and reestablishing the dynamic mirror relationship between the first database and the second database.

In another embodiment, in a network that includes at least two clients, a first and second client being connected together in a dynamic mirror relationship identifying one client as mirror status and the other as live status, a method is disclosed for facilitating restoration of backed-up databases. The method includes receiving a request for a backed-up database, allowing one of the at least two clients access to entries in a file index containing information concerning the dynamic mirror relationship, identifying a location of the backed-up database, retrieving the backed-up database, and transmitting the backed-up database to one of the at least two clients.

In yet another embodiment of the invention, in a network that includes a first database residing on a first client, and a second database residing on a second client, a method is disclosed for restoring backed-up data. The method includes initiating a request for a restore operation, terminating a dynamic mirror relationship between the first database and the second database, identifying target data to be restored, generating a request for location information for the target data, receiving location information concerning the location of the target data, transmitting a request for the target data, receiving the target data, recreating the target data in the first and second databases located on the first and second clients, reestablishing the dynamic mirror relationship between the first database and the second database, retrieving role designation information from a file index, and writing the role designation information in system databases located on the first and second clients.

Still another embodiment of the invention discloses a computer program product for implementing a method for restoring data in a network that includes a first database located on a first client and a second database located on a second client. The computer program includes a computer readable medium carrying executable instructions for performing a method. An embodiment of the invention includes initiating a request for a restore operation, terminating a dynamic mirror relationship between the first database and the second database, identifying target data to be restored, generating a request for location information for the target data, receiving location information concerning the location of the target data, transmitting a request for the target data, receiving the target data, recreating the target data in the first and second databases located on the first and second clients, reestablishing the dynamic mirror relationship between the first database and the second database, retrieving role designation information from a file index, and writing the role designation information in system databases located on the first and second clients These and other embodiments of the present invention will become more fully apparent from the following description and appended claims, or may be learned by the practice of the invention as set forth hereinafter.

BRIEF DESCRIPTION OF THE DRAWINGS

To further clarify the above and other aspects of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings are not drawn to scale. The invention will be described and explained with additional specificity and detail through the use of the accompanying drawings in which.

DETAILED DESCRIPTION OF EXEMPLARY EMBODIMENTS OF THE INVENTION

I. An Exemplary Database Operations System

Figure 1:
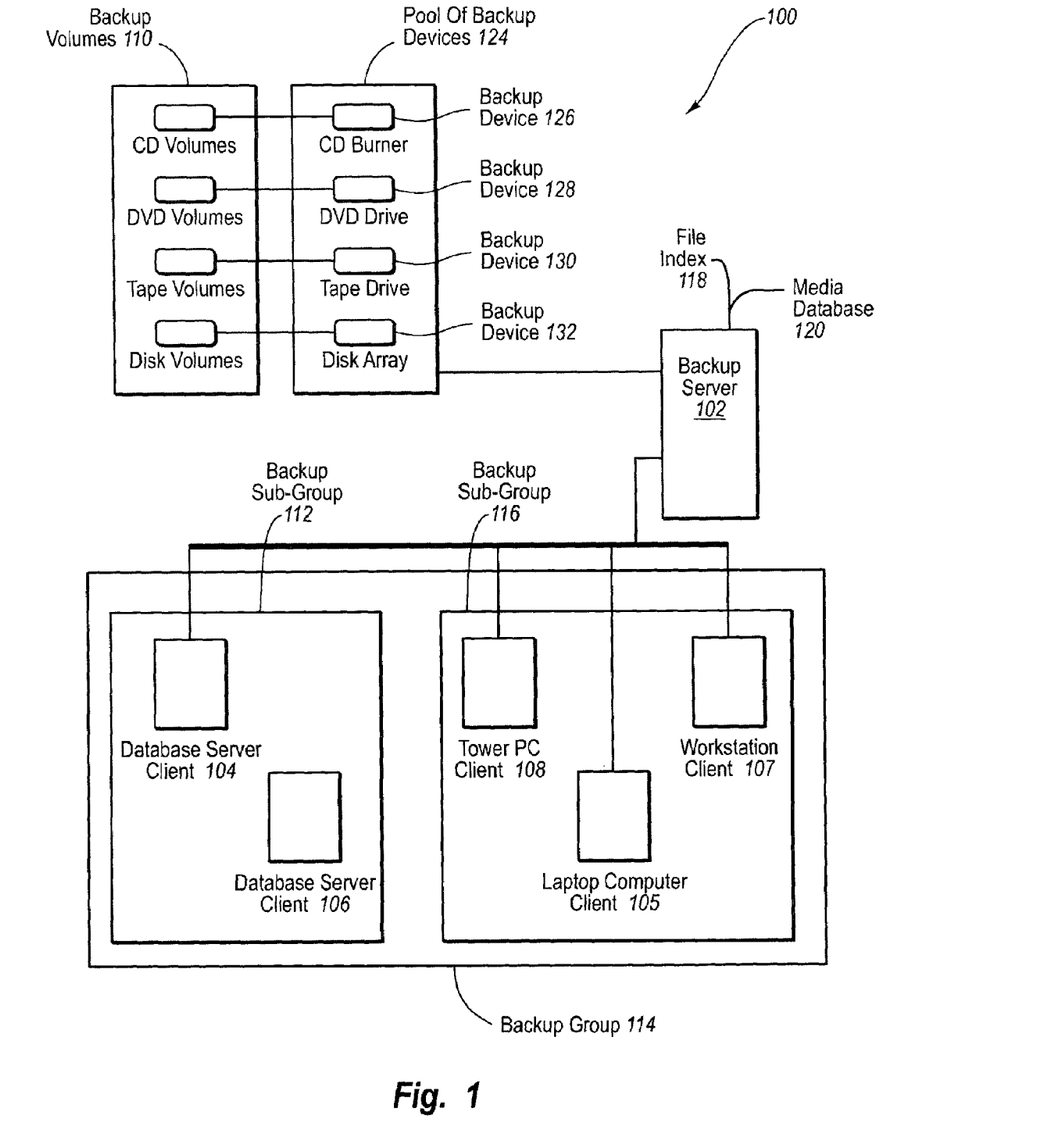
FIG. 1 illustrates an exemplary system for backing up and restoring file system data within a network.

One operational environment suitable for embodiments of the present invention is shown in FIG. 1. FIG. 1 illustrates an exemplary file system data backup and recovery system ("DBRS") 100 which generally functions to reproduce online file system data at a storage location and maintains location and obsolescence tracking information about the data. If the online version of the data is lost or corrupted, the DBRS 100 can recreate the data. In the event that the network in which the DBRS 100 operates experiences a disaster, DBRS 100 can recreate all DBRS 100 file systems to their original respective structures, as the file systems existed when written to storage.

An exemplary embodiment of DBRS 100 includes three basic components: a backup server 102, one or more clients 104, 105, 106, 107 and 108, and backup volumes 110 of data. Backup server 102 and clients 104, 105, 106, 107, and 108 are the entities which have the software necessary to run the DBRS 100 operations. Backup server 102 includes the programs and services that organize and manage the DBRS 100 functions. Clients 104, 105, 106, 107, and 108 include the programs and services that execute the DBRS 100 functions.

Backup server 102 manages data for its set of clients, such as client 104, 105, 106, 107 and 108, for example. The clients 104, 105, 106, 107, and 108 represent machines on the network which deliver files to be backed up. Backup server 102 may incorporate the use of respective backup groups 112, 114, and 116 to organize the clients/data. Backup groups refer to sets of clients and/or data that are backed up together as a group. A single client can be included in multiple backup groups, as shown with backup group 112 and backup group 114.

To manage the data that is backed up from clients 104, 105, 106, 107, and 108, DBRS 100 relies on data tracking information, represented in FIG. 1 by the file index 118 and the media database 120 of backup server 102. The entries in file index 118 and media database 120 maintain content and location information describing all the data, both client machines and files, that has been backed up in the DBRS 100 environment.

File index 118 of backup server 102 is a browseable list of backed-up files organized according to each client. Each file on each client in the network that is backed up is listed in the file index. An entry in the file index 118 includes information about the file such as the file type, the time at which the file was backed up, and other information relating to the file, such as the client machine hosting the original file. Because a file may be backed up multiple times and the backup copies may be stored in multiple locations, entries for a client file in file index 118 and media database 120 may contain information concerning the backup location and time of backup for each backup of the file. The information in the file index 118 and media database 120 concerning multiple backup locations and backup times for a particular file enables a user to identify a specific version of the file for retrieval. Entry information concerning multiple backups of a file can remain in the file index 118 for any amount of time determined by an administrator.

While file index 118 tracks individual files, media database 120 tracks the location at which the files are stored. In other words, the media database 120 contains references to media storage locations. In operation, the media database 120 receives an entry each time a backup group 112, 114, or 116 is backed up to a storage volume on the DBRS 100. Just as with entries in the file index 118, entries will remain in the media database 120 until an administrator removes the entry. Entries in the media database 120 can also be removed if the corresponding data is overwritten.

Once the location information concerning the data is known, the data can be stored in different ways. For example, the data can be stored in media volumes on devices such as tape drives, hard disks, or removable disks accessible from the backup server 102, as shown in FIG. 1, or accessible by way of a remote server. In an exemplary system for backing up data, data is stored in volumes on devices, as exemplified by backup volumes 110 and backup devices 126, 128, 130 and 132. An example of storing data by device and volume is storing data on a disk array, with the data storage sub-grouped into disks. Another example of storing data by device and volume is storing data on a tape drive, with the data storage sub-grouped into specific tape volumes. A final example of storing data by device and volume is storing data on a remote server with the data storage sub-grouped into hard disks on the server. Although these examples are helpful in understanding possible configurations of devices and volumes, the ability of DBRS 100 to store data in devices and volumes is not limited to the examples given. In the most general sense, backup devices 126, 128, 130 and 132 refer to a conceptual model of ways for storing data that are not limited to specific systems or devices.

The usefulness of backup devices 126, 128, 130 and 132 within DBRS 100 is further enhanced by the ability of backup devices 126, 128, 130 and 132 to store data of various types. Specifically, backup devices 126, 128, 130 and 132 can contain data of every file type. For example, backup copies of image files, program execution files, and document files can be stored together in backup devices 126, 128, 130 and 132.

One underlying aspect of backup devices 126, 128, 130 and 132 is the ability of backup devices 126, 128, 130 and 132 to speed retrieval of backed-up files in DBRS 100. For example, when a user requests a restore of a backed-up file, the DBRS 100 can quickly retrieve the file if the file index and media database entries for the file contain highly specific location information including reference to backup devices 126, 128, 130 and 132, and the particular media that was used, such as, for example, the tape, CD, DVD, or other media that was used to store the file.

With regard to many features including backing up to backup devices 126, 128, 130 and 132, DBRS 100 is initially configured to execute functions independently. However, an administrator has many capabilities to control the DBRS 100 functionality. Thus, an administrator can segregate files for storage according to different client and/or file characteristics and can define when a backup volume has become obsolete and should be removed. For example, an administrator could configure the DBRS 100 to remove a backup volume from the media database 120 after a specified period of time has elapsed since the backup was created. An administrator can also define backup groups 112, 114, and 116, which could include one or more clients and their files, directories, or file systems, or all the files on a client machine.

When accessing clients 104, 105, 106, 107, and 108, the administrator can work within an administrator GUI (not shown). The administrator GUI can be displayed on any DBRS 100 machine, allowing an administrator to interface with, and broker services for, any client 104, 105, 106, 107, or 108, regardless of the client platform. Another important aspect of the capabilities of an administrator involves the ability to specify the application environment. For example, an administrator can create records that specify instructions such as backup devices the DBRS 100 will use and the number of clients defined. An administrator can also specify rules that the application will enforce within the backup and recovery environment, including backup scheduling and how long data will be protected before it is recycled.

In addition to administrator capabilities, the DBRS 100 also incorporates a system for recovery of lost data. When client data is lost or corrupted, users or an administrator can browse the recoverable files in file index 118 and then create a report to describe the status of the lost data or the location, tracked by media database 120, of the contents in the volumes on backup devices 126, 128, 130 and 132. The user can then recover the lost data to a user specified point in time. When a request is made to recover lost data, the DBRS 100 locates the data sought and directs recovery of the file(s). Data can be recovered to the client 104, 105, 106, 107, or 108 where the data originated, or to another specified client.

Furthermore, DBRS 100 has the ability to perform in heterogeneous environments and can run on a variety of different platforms. For example, backup software on a UNIX server can support Windows clients or vice-versa. Backup data for any device or volume related to a client can be read and the data of the device or volume can be recreated to a user-specified point in time by any DBRS 100 server, regardless of the server platform. Backup data from any system client 104, 105, 106, 107, or 108 can coexist in a single backup device or on a single media set, regardless of the platform of client 104, 105, 106, 107, or 108.

II. Systems and Methods for Dynamic Backup

A. Components of an Exemplary Mirroring System

The exemplary DBRS 100 outlined above intelligently stores and retrieves files on a network. In addition to the capabilities of the exemplary system discussed above, the exemplary system can support a variety of additional applications and features. One such application incorporates database backup features that account for database mirroring.

Figure 2:
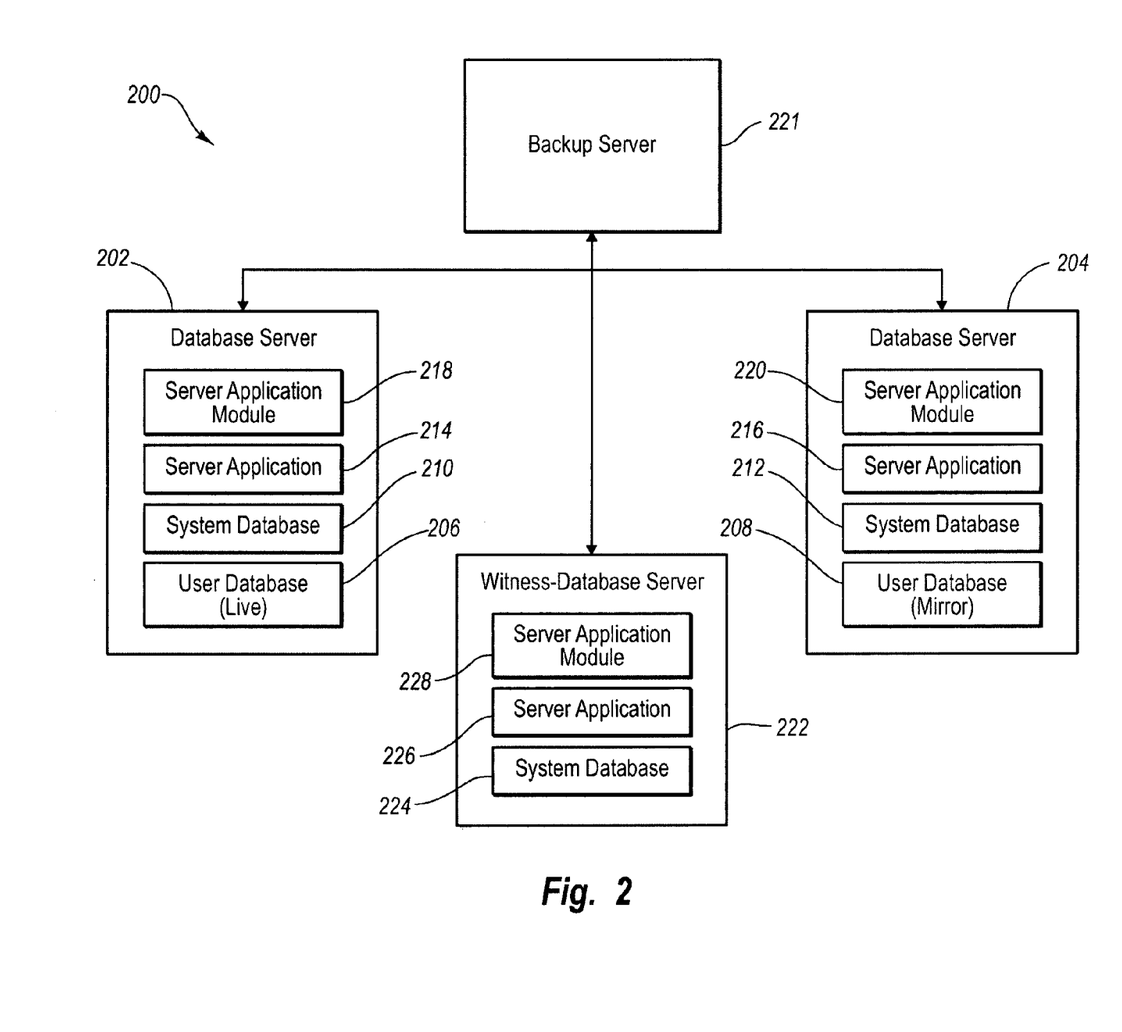
FIG. 2 illustrates an exemplary system for locating databases in a database mirroring environment.

An exemplary database mirroring system 200 is shown in FIG. 2. Database mirroring system 200 includes a database server 202 and a database server 204. One of database server 202 and database server 204 is designated as the primary server, while the other is designated as the secondary server. When database server 202 is designated as the primary server, user database 206 located on server 202 is the live database. Similarly, with database server 204 designated as the secondary server, user database 208 is the mirror database.

In addition to user databases 206 and 208, database server 202 and database server 204 include, respectively, system databases 210 and 212. System databases 210 and 212 contain information which is used to establish the roles of user databases 206 and 208 as either "live" or "mirror." When the user databases 206 and 208 are configured to participate in database mirroring, server applications 214 and 216 update system databases 210 and 212 installed on database server 202 and database server 204, respectively, to contain information concerning the status of user databases 206 and 208 as either "live" or "mirror." Subsequent to this initial setup, all information contained on system databases 210 and 212 concerning the status of user databases 206 and 208 as either "live" or "mirror" is maintained by server applications 214 and 216. Each of server applications 214 and 216 monitors the status of user database 206 as well as user database 208 and records the status of each of user database 206 and user database 208 in the system database associated with the server application. For example, when the status of user database 206 changes from "live" to "mirror," the change in status of user database 206 is monitored by server application 214 and recorded in system database 210. The simultaneous change in status of user database 208 from "mirror" to "live" is also monitored by server application 214 and recorded in system database 210. Likewise, when the status of user database 208 changes from "mirror" to "live," the change in status of user database 208 is monitored by server application 216 and recorded in system database 212. The simultaneous change of status of user database 206 from "live" to "mirror" is also monitored by server application 216 and recorded in system database 212.

While server applications 214 and 216 monitor the status changes of user databases 206 and 208, server application modules 218 and 220 manage the status information of user databases 206 and 208 within database mirroring system 200. A module, such as server application modules 218 and 220, is a piece of code capable of performing a function, such as backup and/or restore of user databases. For example, the function performed by a module could be a backup and/or restore of Microsoft SQL Server databases, in which case user databases 206 and 208 are Microsoft SQL Server databases, and server applications 214 and 216 are Microsoft SQL Server applications. Although the present invention may be used in conjunction with Microsoft SQL Servers, the scope of the invention is not limited to use with Microsoft SQL Servers and extends to any other servers compatible with the systems, devices, and processes disclosed herein.

Each of server applications 214 and 216 is associated with a specific server application module. Further, server application module 218 is associated with server application 214 and server application module 220 is associated with server application 216. On database server 202, server application module 218 queries the status information in system database 210 to find out whether user database 206 is the live user database or the mirror user database. Likewise, on database server 204, server application module 220 queries the status information in system database 212 to find out whether user database 208 is the live user database or the mirror user database. Prior to backup of the live user database in database mirroring system 200, one of server application modules 218 and 220 identifies the current live user database.

Not only do server application modules 218 and 220 identify the live user database during a backup operation, server application modules 218 and 220 also communicate with each other to coordinate and manage the mirror relationship during the backup and restore operations. When server application module 218 or 220 is invoked by backup server 221, which corresponds to backup server 102 shown in FIG. 1, server application modules 218 and 220 are able to detect a change in the designation of user databases 206 and 208. Further, server application modules 218 and 220 communicate with each other concerning the change in the designation of the user databases 206 and 208. After server application modules 218 and 220 communicate with each other, server application module 218 communicates the change in the designation of the user databases 206 and 208 to backup server 221. Backup server 221 is then able to update the information concerning the designations of user databases 206 and 208 in the saveset regarding the database server to be backed up and invoke the server application module 218 or 220 corresponding to the live database to complete the backup operation.

As an example of how server application modules 218 and 220 communicate with each other and subsequently with backup server 221 to complete backup and restore operations, assume a failover occurs causing the status of user database 206 to change from "live" to "mirror." When the server application module 218 is invoked after failover has occurred, server application module 218 communicates with server application module 220 concerning the status of user database 206. Server application module 218 learns from server application module 220 that user database 208 is now the live database. Server application module 218 also informs server application module 220 that user database 206 is currently the mirror database. After communicating with server application module 220, server application module 218 communicates with backup server 221, to notify backup server 221 of the change in status of user database 206 and user database 208. Backup server 221 then records the modified status information in saveset information for the database server to be backed up in database mirroring system 200. This process is called probing and is used to locate the live database.

Before a backup operation can take place within database mirroring system 200, the location of the live database must first be ascertained. When a backup operation is initiated, either of server application 214 located on database server 202 and server application 216 located on database servers 204 may be contacted to locate the live user database. The backup operation can be initiated by a user or by backup server 221. Backup server 221 contacts server application module 218 or 220, which may in turn contact server application 214 or 216, to determine the status of user database 206 and 208. The server application module 218 or 220 corresponding to the live user database 206 or 208 performs the backup operation. The status of user databases 206 and 208 is determined by reading information from system databases 210 and 212. For example, if backup server 221 contacts server application module 218, server application module 218 performs the function of reading table entries in system database 210 by contacting server application 214. Likewise, if backup server 221 contacts server application module 220, server application module 220 performs the function of reading table entries in system database 212 by contacting server application 216. The table entries contained in system databases 210 and 212 contain information regarding the status of user databases 206 and 208. Each system database 210 and 212 contains information regarding the status of each user database 206 and 208 in database mirroring system 200. For example, system database 210 may contain information about the status of user database 206 as "live" and also contain information about the status of user database 208 as "mirror." The information contained in system databases 210 and 212 concerning each of user databases 206 and 208 allows the backup server to obtain information concerning the location of the live database by contacting only one of server applications modules 218 and 220 located on database servers 202 and 204.

As an example of the functions performed in database mirroring system 200 during a backup operation, assume that user database 206 is currently the live user database and user database 208 is currently the mirror database. When a backup is initiated, backup server 221 contacts server application module 220 located on database server 204. Server application module 220 then performs the function of reading the table entries contained in system database 212 by contacting server application 216. The table entries in system database 212 indicate that user database 208 is the mirror database and that user database 206 is the live database. Server application module 220 returns this information to backup server 102. Backup server 102 then backs up user database 206, since user database 206 is currently the live database.

With reference now to FIG. 1, when the live user database is backed up, the name of the database server where the live user database resides is recorded in file index 118 located on backup server 102. The entry made in the file index 118 for the live user database is a live entry. The name of the database server where the mirror database resides is also recorded in the file index 118. The entry made in the file index 118 for the mirror user database is referred to as an alias entry. By recording the status of each user database at the time of a specific backup, entries in the file index 118 make it possible to reconstruct a chain of backups and provide a way to easily identify the location of the live user database in the event restoration of the live user database is requested.

Returning attention now to FIG. 2, it was noted above that in order to make it possible for backup server 102 (FIG. 1) to backup the live user database, the status of user databases 206 and 208 is tracked within database mirroring system 200. While database servers 202 and 204 include, respectively, system databases 210 and 212 which track the status of user databases 206 and 208, witness 222 may also be incorporated into the database mirroring system 200 to track the status of user databases 206 and 208. For example, when user database 206 changes status from "live" database to "mirror" database, witness 222 tracks the change by recording the current status of user database 206 in system database 224. Similarly, when user database 208 changes status from "mirror" database to "live" database, witness 222 also tracks the change in status of user database 208 in system database 224. In this way, system database 224 performs functions similar to those performed by system databases 210 and 212 located, respectively, on database servers 202 and 204.

An additional similarity between witness 222 and database servers 202 and 204 is that, like database servers 202 and 204, witness 222 includes a server application 226 and a server application module 228. Server application 226 performs functions equivalent to the functions performed by server applications 214 and 216. Namely, server application 226 is updated by server applications 214 and 216 regarding the status of user databases 206 and 208 and maintains a record of this information in system database 224. Server application module 228, like server application modules 218 and 220, communicates with server application modules 218 and 220 to learn the status information of user databases 206 and 208 and server application module 228 may also retrieve this information from system database 224 by contacting server application 226.

Witness 222 may perform other functions in addition to tracking the status changes in user databases 206 and 208. For example, witness 222 participates in assigning roles in database mirroring system 200. Specifically, witness 222 may participate in assigning the role of live database to user database 206 and in assigning the role of mirror database to user database 208. The role assignment is based on majority consensus between the live database server 202, the mirror database server 204, and the witness database server 222. More particularly, witness 222 may arbitrate changes in the respective roles of user database 206 and user database 208. Witness 222 may drive automatic failover within database mirroring system 200 and the accompanying change in the status of user databases 206 and 208. For example, if a failover occurs when user database 206 is the live database, witness 222 immediately assigns the role of live database to user database 208 and changes the role of user database 206 to mirror database. By arbitrating the change in the roles of user databases 206 and 208, witness 222 ensures that no data is lost when a failover occurs. Without the presence of witness 222 in database mirroring system 200, a user may opt to drive the failover and assign user database 208 the role of live database and user database 206 the role of mirror database.

Figure 3:
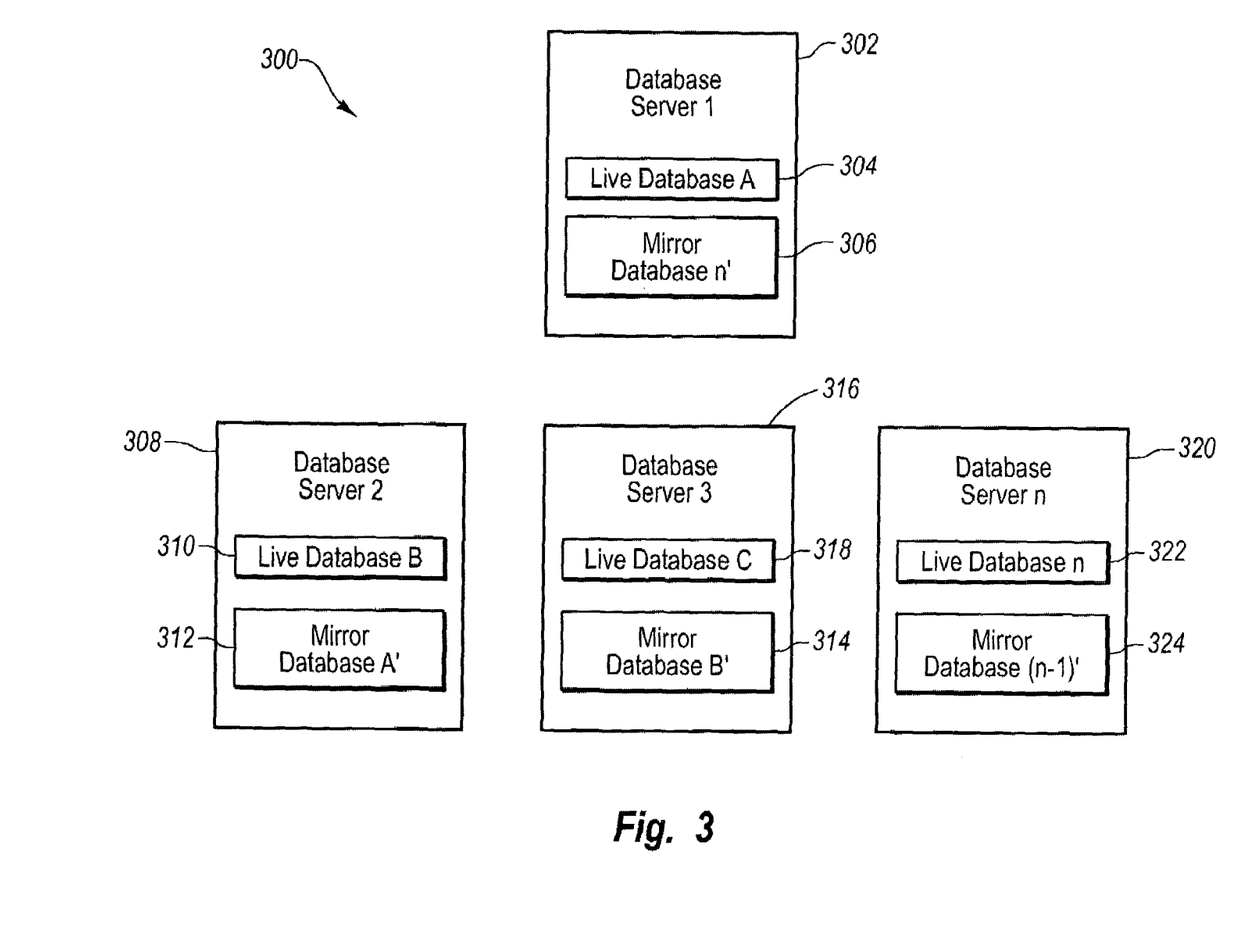
FIG. 3 illustrates an exemplary system for configuring mirroring for any number of databases in a database mirroring environment.

Although a database mirroring system, as shown in FIG. 2, may include only primary server 202, secondary server 204, and witness 222, numerous other configurations of mirroring databases are possible. As shown in FIG. 3, there is no restriction on how many different databases may be mirrored, nor is there any restriction on the relationships between database servers hosting mirror databases. For example, a first database server 302 may host live database "A" 304 as well as mirror database n' 306. Second database server 308 may host live database "B" 310 and mirror database A' 312. In this example, mirror database A' 312 residing on second database server 308 is associated with live database A 304 residing on first database server 302. The mirror database B' 314 associated with live database B 310, however, does not reside on first database server 302 but instead resides on third database server 316. In addition to hosting mirror database B' 314, third database server 316 hosts live database C 318. Finally, nth database server 320 hosts live database n 322 and mirror database (n−1)' 324. FIG. 3 illustrates an exemplary embodiment of a configuration of live and mirror databases on multiple database servers. In addition any database server 302, 308, 316 or 320 might serve as witness for any database. However, any number of different configurations of live and mirror databases on any number of database servers is possible and contemplated by embodiments of the present invention. The scope of the invention is not limited for use in connection with any particular arrangement of live and mirror databases residing on specific servers.

Examples of methods for backing up data disclosed herein are disclosed in U.S. patent application Ser. No. 11/080,229, entitled "Systems and Methods for Dynamic Data Backup," which has been filed on the same day as the present patent application and is incorporated herein by this reference.

B. Mirroring Functionality

Directing attention again to FIG. 2, modules 218, 220 and 228 and user databases 206 and 208 are exemplary components of a database mirroring system 200. Modules 218, 220, and 228, and user databases 206 and 208 are configured to cooperate in a way that allows data to be backed up from databases 206 and 208 in a database mirroring system 200.

As noted earlier, an exemplary database mirroring system 200 includes at least two database servers 202 and 204, user database 206 and user database 208. In a network that includes two or more database servers 202 and 204, each of the user database 206 and the user database 208 may be designated as either the live user database or the mirror user database. Although the user database 206 is initially designated as the live user database, and user database 208 is initially designated as the mirror user database, the designation of a specific database can change at any time. Thus, the roles of "live" and "mirror" are dynamically reassigned. For example, the user database 206 which resides on database server 202 may initially be designated as the live user database. With the user database 206 residing on database server 202 designated as the live user database, the user database 208 residing on database server 204 will be designated as the mirror user database. Later, the roles of the respective user databases 206 and 208 may change, so that the designation of user database 206 will change from "live" to "mirror" and the designation of user database 208 will change from "mirror" to "live." The roles of the respective user databases 206 and 208 may change for any number of reasons, such as failure of the database server 202 on which user database 206, designated as the live user database, resides, a scheduled change in the roles of the respective user databases, or arbitration by an additional database server such as witness 222, or other system device, in the network.

While the user databases included in database mirroring system 200 may be designated as either the live user database or the mirror user database, the clients on which the user databases reside may also be designated at the "live" client or the "mirror" client. The client on which the user database designated as the live user database resides is referred to as the live client, while the client on which the user database designated as the mirror database resides is referred to as the mirror client.

Not only do the roles of user databases 206 and 208 dynamically change within the database mirroring system 200 over time, the roles are also not arbitrary but instead refer to specific functions performed by the respective user databases 206 and 208. In particular, the database mirroring system 200 designates user database 206 as "live" because the user database 206 is the database actively working in the system. In the event of a backup operation, the user database 206, designated as the live user database, is the database which is backed up within database mirroring system 200. At the same time, user database 208, while designated as the mirror user database, is inactive and not directly involved in backup operations so long as user database 208 is designated as the mirror user database.

Although user database 208 designated as the mirror user database is not directly involved in backup operations, the database mirroring system 200 may require the user database 208 designated as the mirror user database to switch roles at any time to assume the role of live user database. For this reason, user database 208 designated as the mirror user database receives and stores information concerning database updates each time tables in the user database 206 designated as the live mirror database are modified. That is, so long as user database 208 is designated as the mirror user database, user database 208 "mirrors" the entries made in the user database 206 designated as the live user database in order to keep an up-to-date record of all the information contained in user database 206 designated as the live user database. In this way, in the event that the database mirroring system 200 requires user database 208 to switch roles from mirror to the live, no user database information is lost or inaccessible because all information present in the user database 206 when user database 206 is functioning as the live user database is also present in the user database 208 when user database 208 is functioning as the mirror user database.

As an exemplary standard for performing database mirroring processes such as those disclosed herein, the Microsoft SQL Server 2005 (codename Yukon) standard is hereby incorporated by reference in this application. In an exemplary embodiment, the present invention can be employed in conjunction with Microsoft SQL Server 2005 (Yukon) databases. However, other uses and applications may also be suitable or desirable in relation to the present invention and the scope of the invention is not limited to use in conjunction with Microsoft SQL Server 2005 (Yukon).

C. Database Restore Operations in a Mirroring Environment

The mirroring functionality of the database system presents additional administrative and logistical considerations for clients who desire to restore lost databases. DBRS 100, shown in FIG. 1, is an example of a database system that could perform backup and recovery operations, although the scope of the invention is not limited to DBRS 100 or any particular database system. The mirroring characteristic of the database system contributes to the creation of an environment in which a database is always available, and therefore always accessible to clients. Clients, also referred to as database servers, are computers within the database mirroring system through which users or administrators access, backup, and restore databases. In a database mirroring system which incorporates clients, a client is not required to have knowledge of the changing roles of the live and mirror databases. When a user wants to initiate a restore operation, the mirror relationship between clients in the database mirroring system is terminated, provided the mirror relationship existed, the database information is retrieved from the restore server, and the database is recreated on clients in the database mirroring system. The mirror relationship is then reestablished and the restore process is completed.

Figure 4:
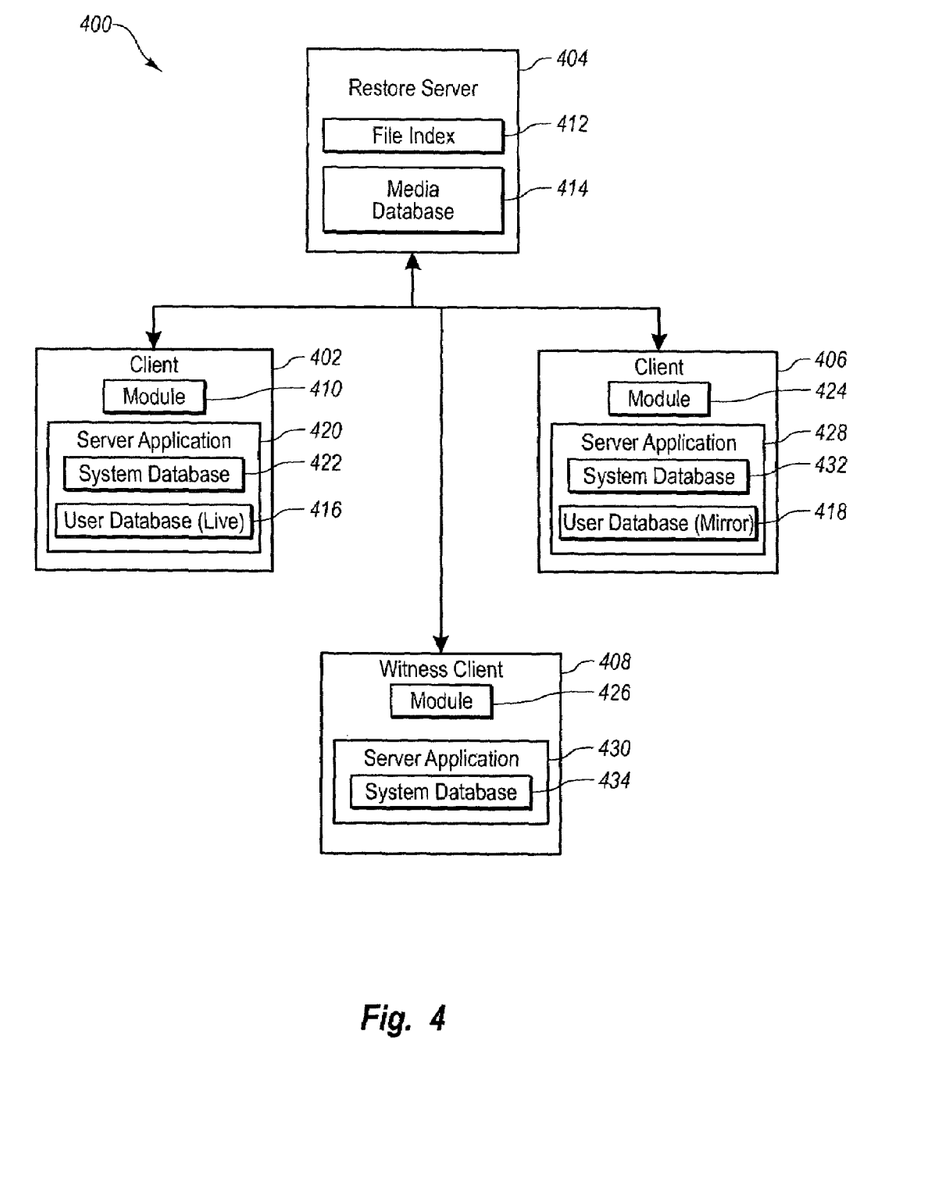
FIG. 4 illustrates an exemplary database restoration system.

With attention now to FIG. 4, details are provided concerning aspects of a database recovery system 400 in connection with which exemplary database restoration operations may be performed. When a client 402 in database restoration system 400 wishes to recreate a user database, client 402 communicates with restore server 404. In addition to functioning as a restore server, restore server 404 may also function as a backup server 102 (shown in FIG. 1) during backup operations in the database mirroring system 100. Client 406, and optional witness client 408, are also present in database recovery system 400 and may communicate with restore server 404 to recreate a user database. In addition, clients 402 and 406 are mirror partners within database recovery system 400. The relationship between mirror partners such as clients 402 and 406 is referred to as a dynamic mirror relationship, defined as a relationship in which the live and mirror role designations of the user databases located on clients such as clients 402 and 406 dynamically change over time.

Although clients 402 and 406, and witness client 408, may each be present in database restoration system 400, restore server 404 processes only one restore request from client 402, client 406, or witness client 408 during a single restore operation. The request sent from client 402, 406, or witness client 408 to restore server 404 may nonetheless involve the recreation of multiple databases. Multiple databases may be recreated on client 402 simultaneously. More particularly, client 402 may be a mirror partner in multiple mirror relationships, as shown in FIG. 3 and addressed in the discussion accompanying FIG. 3. As a result, any of the databases whose mirror relationships client 402 is involved in may be recreated on client 402 in a restore operation. If client 402 is involved in multiple mirror relationships at one time, multiple databases may be recreated on client 402 during a single restore operation.

Restore operations in database recovery system 400 are initiated by a user or administrator accessing client 402, 406, or 408. The client accessed by the user or administrator is referred to as the "current client." In the discussion below, the current client is client 402. It is to be appreciated, however, that the current client could be either client 406 or 408. Because client 402 is the current client in the discussion below, module 410 located on client 402 initially performs module functions, although either of modules 424 or 426 located on clients 406 and 408, respectively, could initially perform module functions in database recovery system 400 if client 406 or 408 was the current client.

When a restore operation is initiated, modules 410, 424, and 426 located on clients 402, 406 and 408, respectively, must terminate the mirror relationship among clients 402, 406, and 408 in database recovery system 400, provided the mirror relationship exists. To begin, module 410 located on current client 402 directs server application 420, also located on current client 402, to terminate the mirror relationship. Server application 420 then overwrites mirror relationship information contained within system database 422. Module 410 also instructs modules 424 and 426 to direct server applications 428 and 430, respectively, to terminate the mirror relationship between clients 402, 406, and 408. Modules 424 and 426 subsequently direct server applications 428 and 430, respectively, to terminate the mirror relationship. Server application 428 overwrites the mirror relationship information contained in system database 432, and server application 430 overwrites the mirror relationship information contained in system database 434. Once the mirror relationship information in system databases 422, 432, and 434 has been overwritten, the mirror relationship among clients 402, 406, and 408 is terminated.

When a restore operation is initiated, the user or administrator accessing the current client must choose a backup version of the database which the user or administrator wishes to recreate. Each time the user database is backed up, a different version of the database may be backed up through the restore server 404. Therefore, the restore server 404 has access to backup copies of any number of different versions of the database. For example, backups of the user database may have occurred at times A, B, and C on day 1, at times D, E, and F on day 2, and at times G and H on day 3. Each of these days and times represents one particular backup version of the user database. The user or administrator wishing to recreate the user database must choose which of these versions to recreate. For example, the user or administrator may determine that the version of the user database the user or administrator wishes to recreate is the version which was backed up at time G on day 3. When a restore operation is initiated, the current client will request from restore server 404 the user database that was backed up at time G on day 3. The particular backup version of the user database which the user or administrator chooses to recreate is also referred to as "target data."

Information concerning the target data, as well as all versions of the user database that have been backed up through restore server 404, is contained in file index 412 and media database 414 located on restore server 404. The user or administrator accessing the current client is not required to know independently the target data the user or administrator wishes to recreate. Through module 410 located on client 402, the user or administrator accesses file index 412 and media database 414 located on restore server 404 and may review the information contained in file index 412 and media database 414. By reviewing the information contained in file index 412 and media database 414 concerning the backup versions of the user database, the user or administrator can identify the target data. Information in the file index 412 and media database 414 includes identifying characteristics concerning all backed-up versions of the user databases, such as, for example, the date the backup was performed, the time at which the backup was performed, and the storage location of the particular backup version of the user database.

Additional information included in file index 412 for each backup version of the user database includes the status of the client hosting the user database at the time backup of the user database was performed. For example, if client 402 was the live client at the time the target data was backed up, file index 412 will contain a live entry for client 402. Likewise, if client 402 was the mirror client at the time the target data was backed up, file index 412 will contain an alias entry for client 402. Because the designation of client 402 as the live or mirror client indicates whether the user database 416 located on client 402 is designated as the live or mirror user database, live and alias entries in file index 412 implicitly indicate whether user database 416 was designated as the live or mirror database at the time of the backup operation. Information in file index 412 concerning the designation of client 402, as well information concerning the designations of client 406 and 408, at the time the backup of the target data was performed becomes important for reestablishing the mirror relationship in database recovery system 400 once the target data has been recreated. Reestablishment of the mirror relationship is discussed in further detail below.

As noted above, module 410 located on client 402 accesses file index 412 and media database 414 located on restore server 404 to enable the user or administrator to identify the target data and to obtain information concerning the target data. After module 410 located on client 402 has accessed the information contained in file index 412, module 410 requests the target data from restore server 404. Restore server 404 locates and retrieves the target data and communicates the target data to module 410. After the target data has been retrieved, module 410 communicates the target data to server application 420. Server application 420 then uses the target data to recreate user database 416.

In addition to communicating with server application 420, module 410 also communicates with modules 424 and 426 of client 406 and 408, respectively. In particular, module 410 communicates the target data, retrieved by restore server 404, to modules 424 and 426. Module 424 then communicates received the target data to server application 428, and server application 428 then uses that target data to recreate user database 418. Module 426 does not communicate the target data to client 408 because server application 430 located on client 408 does not include a user database. User databases 416 and 418 are recreated by server applications 420 and 428, respectively, using identical target data. Therefore, once user databases 416 and 418 have been recreated, each user database 416 and 418 contains an identical copy of the target data. However, the user initiating the restore operation in database recovery system 400 may choose to restore only one user database, such as user database 416, and preserve user database 418 so that user database 418 is not overwritten.

After the user databases 416 and 418 have been recreated, the mirror relationship among clients 402, 406, and 408 is reestablished. Information obtained by module 410 from file index 412 concerning the designation of clients 402, 406, and 408 at the time the backup operation took place is used in re-designating clients 402, 406, and 408 as live, mirror, or witness clients. If the information obtained by module 410 from file index 412 concerning current client 402 indicates that current client 402 was the live client at the time of the backup operation, current client 402 is re-designated as the live client. Re-designation of current client 402 as the live client implicitly includes re-designating user database 426 as the live user database. If information contained in file index 412 indicates that current client 402 was the mirror client at the time the target data was backed up, the user may choose to re-designate client 402 as the mirror client, thus re-designating user database 416 as the mirror user database.

Although module 410 has obtained information concerning the designations of clients 402, 406 and 408 as either live, mirror, or witness, the mirror relationship is not reestablished until server applications 420, 428, and 430 write role designation information in system databases 422, 432, and 434, respectively. Module 410, having obtained the role designation information from file index 412, communicates the role designation information to server application 420. Server application 420 then writes the role designation information in system database 422. Module 410 communicates the role designation information with modules 424 and 426 and modules 424 and 426 communicate with server applications 428 and 430, respectively. Server applications 428 and 430 then write the role designation information in system databases 432, and 434, respectively. The role designation information indicates that client 402 was the live client and that client 406 was the mirror client at the time of the backup of the target data. The role designation information likewise indicates that user database 416 located on client 402 was designated as the live user database and that user database 418 located on client 406 was designated as the mirror user database at the time the backup of the target data was performed. Clients 402 and 406 are re-designated as live client 402 and mirror client 406 when the role designation information is written by server applications 420, 428, and 430 in system databases 422, 432, and 434, respectively. Client 408 is re-designated as the witness client because information in the file index indicates that client 408 is neither the live client nor the mirror client. A detailed explanation of the restore process performed in database recovery system 400 is included in a discussion of FIG. 5 below.

Figure 5:
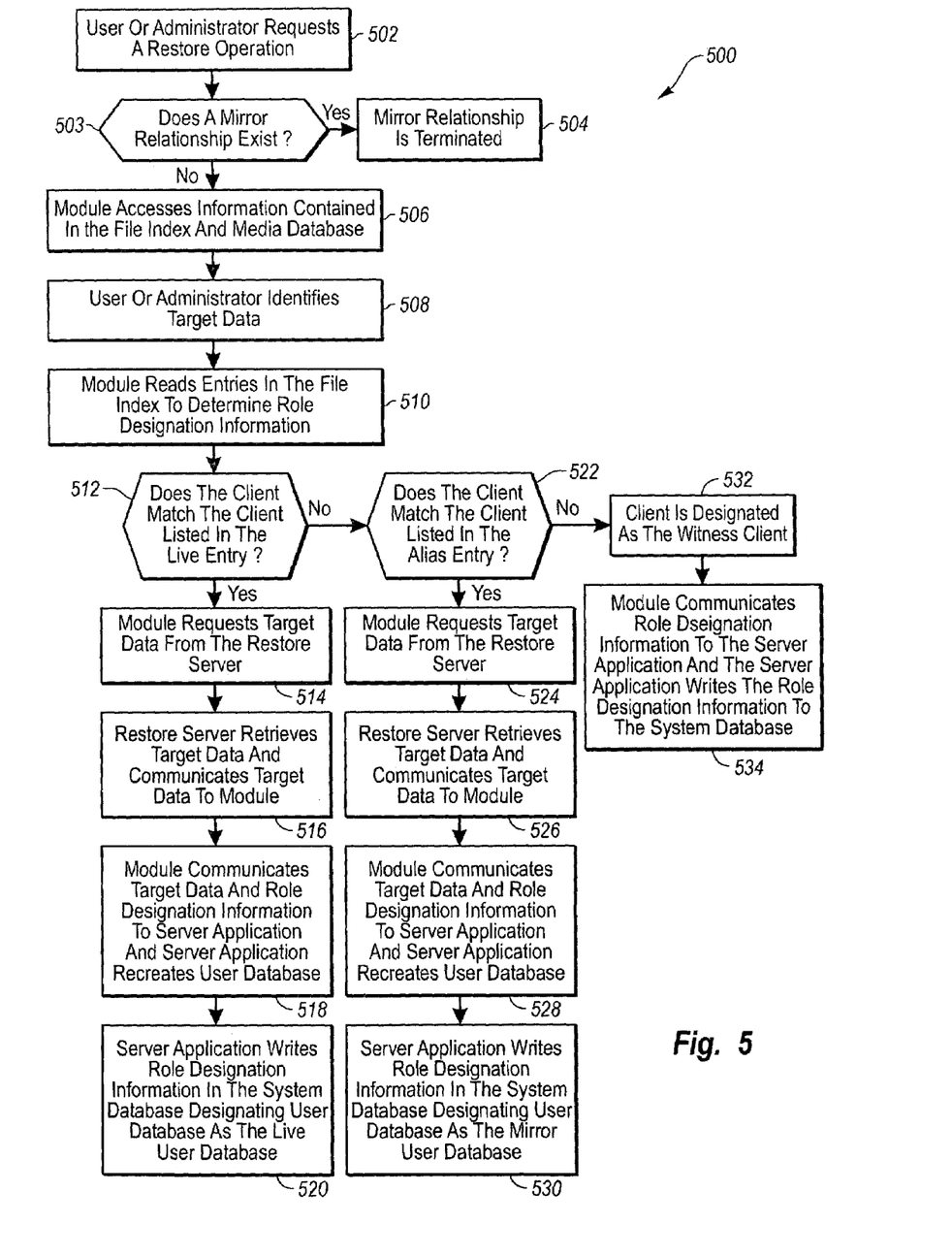
FIG. 5 is a flow diagram depicting a process for restoring data by requesting target data from a database.

With attention now to FIG. 5, exemplary restore process 500 performed in a database recovery system such as the exemplary database recovery system 400, illustrates how the mirror relationship between clients is terminated, user database information is recreated on clients, and the mirror relationship between clients is reestablished. The restore process 500 occurs concurrently on each client present in the database recovery system and participating in the mirror relationship. In addition, the stages comprising restore process 500 are exemplary, and the order of performance can be changed to suit any particular application of restore process 500. The process 500 begins at stage 502 when the user or administrator accessing the client requests a restore operation. At stage 503, the existence or non-existence of a mirror relationship between the clients of the database recovery system is determined. If a mirror relationship exists, the mirror relationship between the clients of the database recovery system is terminated, as shown at stage 504. The mirror relationship is terminated when server applications located on each client overwrite system databases present within the server applications. If a mirror relationship does not exist between the clients, then, at stage 506, a module located on a client in the database recovery system accesses information contained in the file index and media database located on the restore server. The information obtained by the module from the file index and media database includes both identification information and role designation information concerning different backup versions stored through the restore server.

The identification information obtained by the module may help the user or administrator accessing the client on which the module is located to identify the particular backup version of the database, or target data, the user or administrator wishes to restore. The role designation information will enable the mirror relationship to be reestablished once the user database information is recreated.

With continuing reference to restore process 500, at stage 508 the user or administrator identifies the target data to be recreated. Then, at stage 510, the client reads entries in the file index to identify role designation information. At stage 512, the module determines whether the client on which the module is located matches the client listed in the file index entry for the target data as a live entry. If the client matches the client listed in the live entry, restore process 500 continues as the module requests the target data from the restore server, as shown at stage 514. The restore server retrieves the target data and communicates the target data to the module, as shown at stage 516. The module then communicates the target data to the server application and the server application recreates the user database located on the current client, as shown at stage 518.

When the module communicates the target data to the server application, the module also communicates the role designation information, obtained by the module from the file index, to the server application at stage 518. At stage 520, the server application writes the role designation information in the system database located in the server application on the client and establishes the user database located on the client as the live user database while at the same time establishing the client as the live client.

In the event that the client does not match the client listed in the live entry of the file index, at stage 512, the restore process 500 continues at stage 522 where the client determines if the client matches the client listed in the alias entry of the file index. If the client matches the client listed in the alias entry of the file index, restore process 500 continues to stage 524 where the module requests the target data from the restore server. The restore server retrieves the target data and communicates the target data to the module, as shown at stage 526. The module then communicates the target data to the server application and the server application recreates the user database located on the client associated with the module and the server application, as shown at stage 528.

As noted above, when the module communicates the target data to the server application, the module also communicates the role designation information, obtained by the module obtained from the file index, to the server application, also shown at stage 528. At stage 530, the server application writes the role designation information in the system database located in the server application on the client and establishes the user database located on the client as the mirror user database while at the same time establishing the client as the mirror client.

When the module accesses the information contained in the file index and media database the module may determine that the client matches neither the client listed in the live entry of the file index nor the client listed in the alias entry of the file index. In this case, as shown at stage 532, the client is the witness client. The module communicates the role designation information obtained from the file index to the server application of the client and the server application writes the role designation information in the system database located on the client, at stage 534. After the target data has been recreated and the role designation information has been written in the system databases of each client in the database recovery system, the mirror relationship is reestablished and the restore process 500 is completed.

Thus, the exemplary restore process 500 provides a way to restore target data that was backed up from user databases engaged in a mirror relationship. By terminating the mirror relationship, retrieving and recreating lost user database information, and reestablishing database mirroring relationships, embodiments of the present invention provide a method to restore data which has been backed up in a dynamic database mirroring environment where the role designations of user databases in the environment dynamically change over time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network that includes a first database residing on a first client, and a second database residing on a second client, the first and second databases being connected together in a dynamic mirror relationship identifying one database as mirror status and the other as live status, a method for restoring backed-up data comprising:

initiating a request for a restore operation;
   terminating the dynamic mirror relationship between the first database and the second database, wherein the first database has a first status and the second database has a second status when the dynamic mirror relationship is terminated;

identifying target data to be restored by selecting a particular backup version from a plurality of backup versions;

generating a request for location information for the target data;

receiving location information concerning the location of the target data;

transmitting a request to a restore server for the target data;

receiving the target data from the restore server;

recreating the target data in the first and second databases located on the first and second clients; and reestablishing the particular dynamic mirror relationship between the first database and the second database, wherein the first status and the second status are re-designated according to role designation information associated with the particular backup version.

2. The method as recited in claim 1, wherein the target data is identified by locating information contained in a file index and a media database located on a restore server.

3. The method as recited in claim 1, wherein the dynamic mirror relationship is reestablished by writing role designation information in system databases located on the first client and the second client respectively.

4. The method as recited in claim 1, further comprising:
retrieving the role designation information from a file index; and
writing the role designation information in system databases located on the first and second clients.

5. The method as recited in claim 4, wherein the role designation information references the role designations of the first and second databases at the time of the backup of the target data.

6. The method as recited in claim 4, wherein a live entry in the file index indicates that first or second database listed in the live entry was designated as the live database at the time the backup of the target data was performed.

7. The method as recited in claim 4, wherein an alias entry in the file index indicates that the first or second database listed in the alias entry was designated as the mirror database at the time the backup of the target data was performed.

8. The method as recited in claim 1, wherein a witness client arbitrates the dynamic mirror relationship.

9. The method as recited in claim 1, wherein the mirror relationship is reestablished by writing role designation information in system databases located on the first client, the second client, and a witness client.

10. In a network that includes at least two clients, a first and second client being connected together in a dynamic mirror relationship identifying one client as mirror status and the other as live status, a method for facilitating restoration of backed-up databases comprising:
receiving a request for a backed-up database;
allowing one of the at least two clients access to entries in a file index containing information concerning the dynamic mirror relationship at a time of the backed-up database to allow the dynamic mirror relationship at the time of the backed-up database to be restored;
identifying a location of the backed-up database;
retrieving the backed-up database; and
transmitting the backed-up database and the dynamic mirror relationship to one of the at least two clients.

11. The method as recited in claim 10, wherein entries in the file index record the role designation of a database at the time a backup of the database is performed.

12. The method as recited in claim 10, wherein a live entry in the file index indicates a database referenced in the entry was designated as the live database at the time a backup of the database was performed.

13. The method as recited in claim 10, wherein an alias entry in the file index indicates a database referenced in the entry was designated as the mirror database at the time a backup of the database was performed.

14. The method as recited in claim 10, wherein the location of the backed-up database is a remote storage location.

15. The method as recited in claim 10, wherein retrieving the backed-up database further comprises:
accessing a storage location; and
obtaining a copy of the backed-up database from the storage location.

16. In a network that includes a first database residing on a first client, and a second database residing on a second client, a method for restoring backed-up data comprising:
initiating a request for a restore operation;
terminating a dynamic mirror relationship between the first database and the second database;
identifying target data to be restored;
generating a request for location information for the target data;
receiving location information concerning the location of the target data;
transmitting a request for the target data;
receiving the target data;
recreating the target data in the first and second databases located on the first and second clients;
reestablishing the dynamic mirror relationship between the first database and the second database;
retrieving role designation information from a file index; and
writing the role designation information in system databases located on the first and second clients.

17. The method as recited in claim 16, wherein the role designation information references the role designations of the first and second databases at the time of the backup of the target data.

18. The method as recited in claim 16, wherein a live entry in the file index indicates that first or second database listed in the live entry was designated as the live database at the time the backup of the target data was performed.

19. The method as recited in claim 16, wherein an alias entry in the file index indicates that the first or second database listed in the alias entry was designated as the mirror database at the time the backup of the target data was performed.

20. A computer program product for implementing a method for restoring data in a network that includes a first database located on a first client and a second database located on a second client, the computer program product comprising:
a computer readable medium carrying executable instructions for performing a method, wherein the method comprises:
initiating a request for a restore operation;
terminating a dynamic mirror relationship between the first database and the second database;
identifying target data to be restored;
generating a request for location information for the target data;
receiving location information concerning the location of the target data;
transmitting a request for the target data;
receiving the target data;

recreating the target data in the first and second databases located on the first and second clients;
reestablishing the dynamic mirror relationship between the first database and the second database;
retrieving role designation information from a file index; and
writing the role designation information in system databases located on the first and second clients.

21. The computer program product as recited in claim 20, wherein the role designation information references the role designations of the first and second databases at the time of the backup of the target data.

22. The computer program product as recited in claim 20, wherein a live entry in the file index indicates that first or second database listed in the live entry was designated as the live database at the time the backup of the target data was performed.

23. The computer program product as recited in claim 20, wherein an alias entry in the file index indicates that the first or second database listed in the alias entry was designated as the mirror database at the time the backup of the target data was performed.

* * * * *